United States Patent [19]
Dennison

[11] 3,877,762
[45] Apr. 15, 1975

[54] TURBINE REAR BEARING SUPPORT STRUCTURE

[75] Inventor: William T. Dennison, West Hartford, Conn.

[73] Assignee: United Aircraft Corporation, East Hartford, Conn.

[22] Filed: Mar. 19, 1974

[21] Appl. No.: 452,765

[52] U.S. Cl. .................................................. 308/15
[51] Int. Cl. ............................................ F16c 35/00
[58] Field of Search ........................... 308/15, 22, 27

[56] References Cited
UNITED STATES PATENTS

| | | | |
|---|---|---|---|
| 2,616,662 | 11/1952 | Mierley | 308/15 |
| 2,829,014 | 4/1958 | May | 308/15 |
| 2,928,648 | 3/1960 | Haines et al. | 308/15 X |

*Primary Examiner*—M. Henson Wood, Jr.
*Assistant Examiner*—Gene A. Church
*Attorney, Agent, or Firm*—Charles A. Warren

[57] ABSTRACT

A bearing support structure for a turbine includes a plurality of flat struts extending between inner and outer rings and attached to each by axially extending pins or bolts, a portion of the strut having attachment surfaces to which the inner and outer walls of the gas duct are attached. The inner ring supports a bearing for the turbine shaft.

4 Claims, 1 Drawing Figure

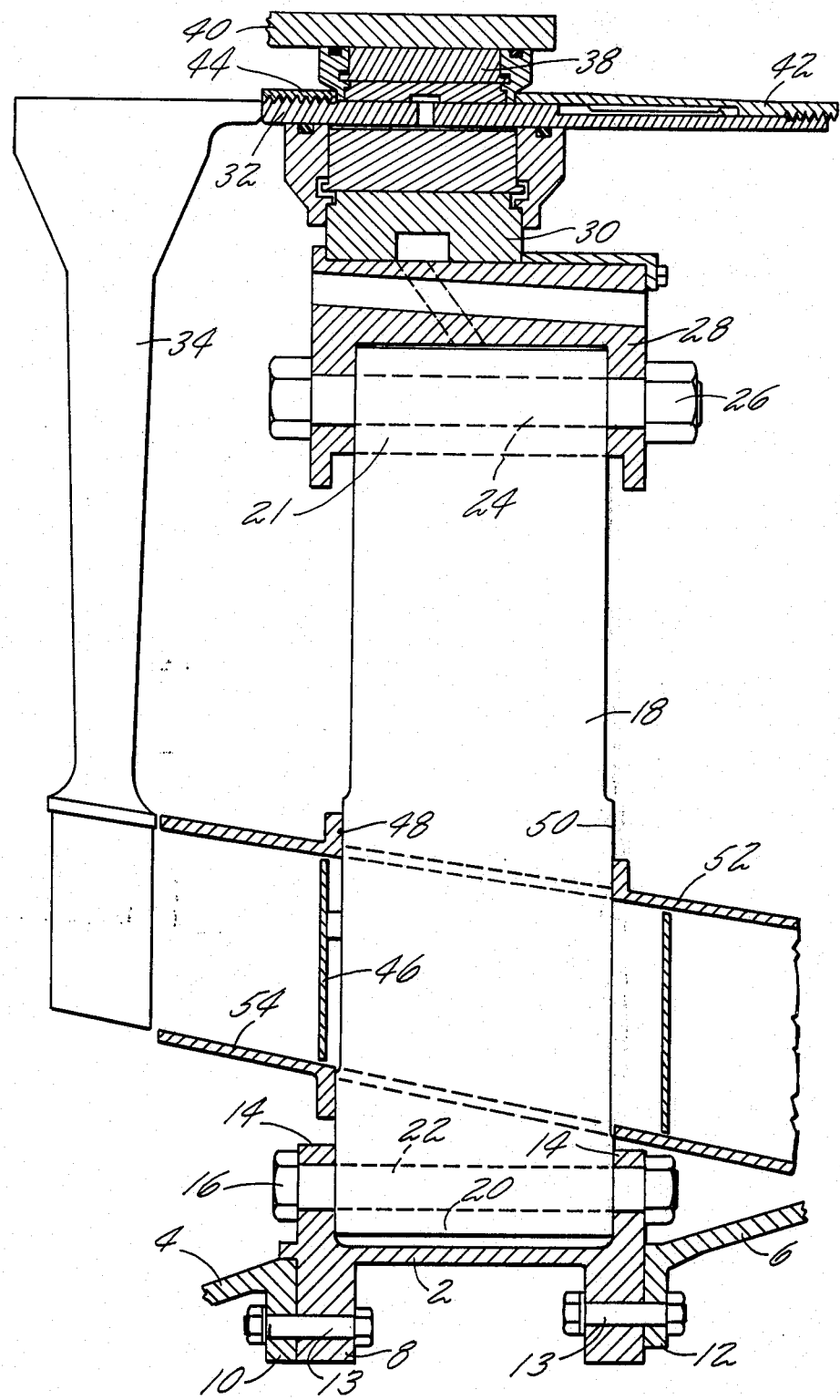

TURBINE REAR BEARING SUPPORT STRUCTURE

BACKGROUND OF THE INVENTION

The turbine discs in a gas turbine engine are supported at the downstream side by a bearing which is held in position by a support structure having arms extending inwardly from the outer casing across the gas path to engage and support the bearing. The arms or struts are exposed to the heat of the gas and provision must be made for thermal expansion especially during transient operating conditions of the engine.

SUMMARY OF THE INVENTION

One feature of the invention is a bearing support structure that is simple to build and assemble, and which will not impose significant thermal stresses on the adjacent structural parts. Another feature is a built-up bearing support structure that is readily assembled or disassembled when necessary.

According to the invention, the bearing support structure includes an outer casing ring, an inner support ring for the bearing, a plurality of struts extending between said rings and pivotally attached to both on axes parallel to the axis of the rings, the struts being substantially flat and having mounting surfaces thereon for attachment of the inner and outer duct walls for the power gas duct.

Other features and advantages will be apparent from the specification and claims and from the accompanying drawing which illustrates an embodiment of the invention.

BRIEF DESCRIPTION OF THE DRAWING

The single FIGURE is a sectional view through a turbine construction showing the bearing support structure.

DETAILED DESCRIPTION OF THE PREFERRED EMBODIMENT

The outer casing for the turbine includes a casing ring 2 attached to and supported between an upstream casing member 4 and a downstream casing member 6. The casing ring has spaced outwardly extending flanges 8 and the members 4 and 6 have cooperating flanges 10 and 12, respectively, for releasable attachment of the members to the ring as by bolts 13.

The ring 2 has a plurality of pairs of axially spaced inwardly extending lugs 14, each pair receiving a bolt or pin 16 to engage with the outer end of a strut 18. The latter is generally flat between its ends except for an enlargement 20 at the outer end and an enlargement 21 at the inner end. The outer end enlargement has a bore 22 to receive the bolt 16 and the inner end has a parallel bore 24 to receive a pin or bolt 26 positioned in an inner ring or housing 28. These pins extend parallel to the longitudinal axis of the rings as will be apparent.

The bearing 30 is positioned within the inner ring 28 and supports the shaft 32 on which is mounted, forwardly of the support structure, a turbine disc 34 the latter being attached to or, as shown integral with the shaft. The shaft 32 may itself carry a second bearing 38 for the support of a second shaft 40 within and concentric to the first shaft. The bearing 38 is clamped within the shaft 32 by a sleeve 42 having a threaded engagement with the shaft 32. This sleeve clamps the bearing 38 against a shoulder 44 in the shaft 32.

It will be understood that, with a plurality of support struts, there will be a plurality of circumferentially spaced axially extending pins or bolts 16 positioned in the outer ring, one for each strut and these are preferably uniformly spaced about the ring and preferably located all at the same radius from the center of the ring. Similarly the inner ring will have the plurality of circumferentially spaced axially extending pins or bolts 26, one for each strut and these pins are preferably uniformly spaced circumferentially and all located at the same radius from the center of the ring. The struts may be positioned somewhat off from an exact radius so that they all extend tangential to a circle concentric to the axis of the rings in order to permit the necessary thermal expansion to occur without over-stressing the structural parts.

With a plurality of struts 18 supporting the inner ring it will be apparent that the inner ring and bearing are securely located by the struts in concentric relation to the casing ring 2 and the support is such that thermal expansion does not over stress any of the parts. Further the axial arrangement of the pins provides a secure and positive fore and aft location of the inner ring and bearing with respect to the outer ring thereby keeping the bearing always in the desired position.

Since there is no bending load applied to these struts in a circumferential direction they may be relatively thin in this direction and relatively long in the axial direction in which there may be a bending load. Thus very little obstruction of the gas path is caused by these struts. A very flat airfoil shield 46 may be positioned over the portion of the strut located in the gas path to reduce thermal stresses resulting when starting up or stopping the unit.

Each of the struts has flat mounting surfaces 48 and 50 thereon at leading and trailing edges for the attachment thereto of the inner duct wall 52 and the outer duct wall 54 which define between them the gas path for the gas powering the turbine. Obviously the duct walls are each in two pieces, one upstream of and the other downstream of the struts with extensions on one of the pieces to extend into engagement with the other of the pieces between the struts to form a continuous duct wall.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. A bearing support structure for a turbine shaft including:
   an outer casing ring;
   an inner bearing support ring spaced from and concentric to the outer ring;
   a plurality of struts extending between said rings and having a pivotal connection with each ring, the pivotal connection being parallel to the ring axis;
   a bearing supported within the inner ring; and
   a shaft supported by said bearing;
   said struts being relatively flat and having enlargements at each end for the pivotal connections.

2. A bearing support structure as in claim 1 in which the outer ring supports a plurality of circumferentially spaced axially extending pins on which the outer ends of the struts are pivoted.

3. A bearing support structure as in claim 1 in which the inner ring supports a plurality of circumferentially spaced axially extending pins on which the inner ends of the struts are positioned.

4. A bearing support structure as in claim 1 in which the struts are relatively flat in cross section with the greater dimension extending axially of the structure, and with enlargements at opposite ends to receive the pivotal connections.

* * * * *